(12) United States Patent
Chen et al.

(10) Patent No.: US 9,966,854 B2
(45) Date of Patent: May 8, 2018

(54) SYNCHRONOUS RECTIFICATION CONTROL METHOD AND CONTROL CIRCUIT AND SWITCHING VOLTAGE REGULATOR

(71) Applicant: Silergy Semiconductor Technology (Hangzhou) LTD, Hangzhou, ZheJiang Province (CN)

(72) Inventors: Jun Chen, Hangzhou (CN); Jue Wang, Hangzhou (TW)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 284 days.

(21) Appl. No.: 14/498,739

(22) Filed: Sep. 26, 2014

(65) Prior Publication Data

US 2015/0102793 A1 Apr. 16, 2015

(30) Foreign Application Priority Data

Oct. 12, 2013 (CN) .......................... 2013 1 0474740

(51) Int. Cl.
*H02M 3/156* (2006.01)
*H02M 3/158* (2006.01)

(52) U.S. Cl.
CPC ....... *H02M 3/1588* (2013.01); *Y02B 70/1466* (2013.01)

(58) Field of Classification Search
CPC .... H02M 3/1588; H02M 1/32; H02M 1/4208; H02M 3/157; H02M 3/1584; Y02B 70/126

See application file for complete search history.

(56) References Cited

U.S. PATENT DOCUMENTS

| | | | |
|---|---|---|---|
| 6,396,250 B1 * | 5/2002 | Bridge | H02M 3/1588 323/283 |
| 8,416,587 B2 | 4/2013 | Chen | |
| 2007/0081371 A1 * | 4/2007 | Wittenbreder, Jr. | H02M 1/08 363/127 |
| 2010/0039078 A1 * | 2/2010 | Suda | H03K 19/00346 323/212 |
| 2011/0012538 A1 * | 1/2011 | Ren | H02M 3/33592 315/307 |
| 2012/0049829 A1 * | 3/2012 | Murakami | H02M 1/32 323/288 |
| 2013/0051083 A1 | 2/2013 | Zhao | |
| 2014/0078788 A1 | 3/2014 | Yao et al. | |

* cited by examiner

*Primary Examiner* — Nguyen Tran
*Assistant Examiner* — Monica Mata
(74) *Attorney, Agent, or Firm* — Michael C. Stephens, Jr.

(57) ABSTRACT

In one embodiment, a synchronous rectification control method can include: (i) setting or updating a count value when a rectification switch is turned on; (ii) generating an off enable signal after a delay time corresponding to the count value has elapsed; (iii) turning off the rectification switch based on the off enable signal, and comparing a drain-source voltage of the rectification switch against a reference voltage; and (iv) generating a comparison signal for updating the count value based on the drain-source voltage and the reference voltage.

20 Claims, 5 Drawing Sheets

US 9,966,854 B2

1

SYNCHRONOUS RECTIFICATION CONTROL METHOD AND CONTROL CIRCUIT AND SWITCHING VOLTAGE REGULATOR

RELATED APPLICATIONS

This application claims the benefit of Chinese Patent Application No. 201310474740.4, filed on Oct. 12, 2013, which is incorporated herein by reference in its entirety.

FIELD OF THE INVENTION

The present invention relates to electronics, and more particularly to a synchronous rectification control method, control circuits, and a switching voltage regulator.

BACKGROUND

For better switching mode power supply performance, a synchronous rectification switch can be turned off when an inductor current is zero. That is, the switching mode power supply can operate in a discontinuous conduction mode (DCM). In a DCM mode of operation, due to the rectification switch being turned off when the inductor current is zero, the switching mode power supply can substantially eliminate output filter current, may reduce electromagnetic and switching losses, as well as may prevent the current from flowing back, in order to improve overall stability.

SUMMARY

In one embodiment, a synchronous rectification control method can include: (i) setting or updating a count value when a rectification switch is turned on; (ii) generating an off enable signal after a delay time corresponding to the count value has elapsed; (iii) turning off the rectification switch based on the off enable signal, and comparing a drain-source voltage of the rectification switch against a reference voltage; and (iv) generating a comparison signal for updating the count value based on the drain-source voltage and the reference voltage.

In one embodiment, a synchronous rectification control circuit can include: (i) a counting circuit configured to set or update a count value when a rectification switch is turned on; (ii) a delay circuit configured to receive the count value, and to generate an off enable signal after a delay time corresponding to the count value has elapsed; (iii) a main control circuit configured to receive the off enable signal, and to turn off the rectification switch according to the off enable signal; and (iv) a comparison circuit configured to compare a drain-source voltage of the rectification switch against a reference voltage after the rectification switch is turned off, and to provide a comparison signal to the counting circuit to update the count value.

2

Figure 4:
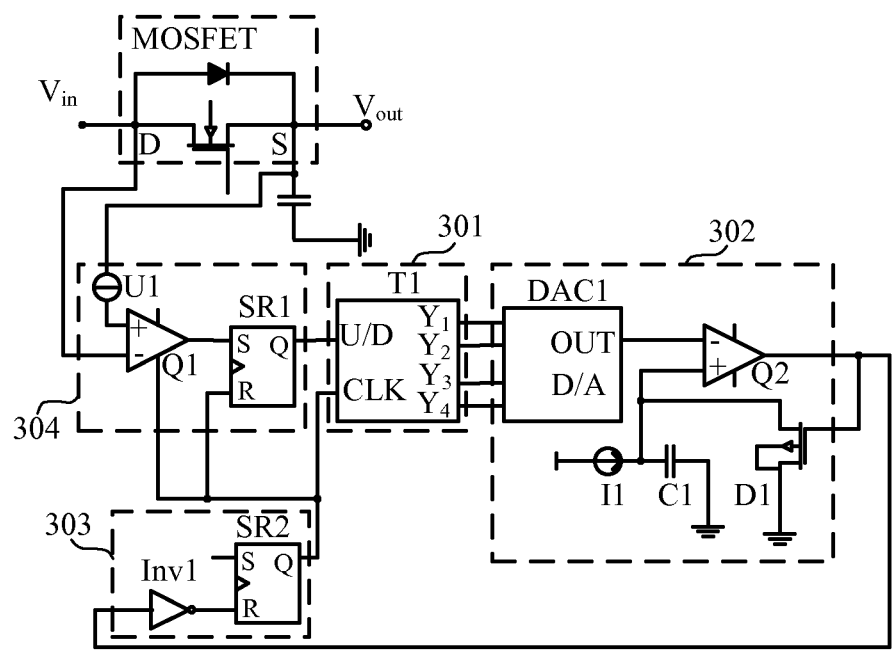
Figure 5:
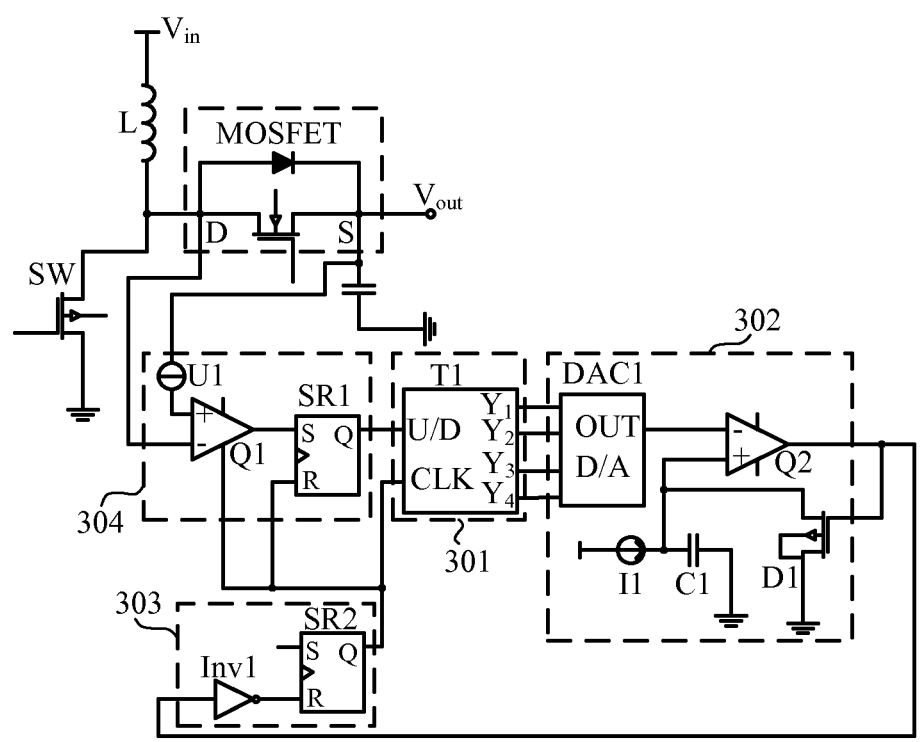

FIG. 4 is a schematic block diagram of an example synchronous rectification control circuit, in accordance with embodiments of the present invention.
FIG. 5 is a schematic block diagram of an example switching voltage regulator, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In order to have a switch mode power supply (SMPS) or switching voltage regulator operate in discontinuous conduction mode (DCM), a zero point of an inductor current in a synchronous rectification circuit may be detected, and the rectification switch can be turned off when the zero point (e.g., no current) is detected. For example, a current signal indicative of the inductor current flowing through the rectification switch can be converted to a voltage signal via a self on-resistor of the rectification switch, so a voltage across the rectification switch is zero when the inductor current is zero. In such a case, a zero-crossing comparator (e.g., a comparator with a zero reference voltage) can be used to detect the voltage across the rectification switch, and the zero-crossing comparator can activate a signal to turn off the rectification switch when the detected voltage is zero. In this way, the rectification switch can be turned off at substantially the same time as the inductor current going to zero.

In this approach the comparator transitions and the rectification switch is turned off only when the reference voltage is zero and the detected voltage input to the rectification switch is zero. However, an input offset voltage (e.g., 0.03V) can exist in practical comparator applications, and when an on-resistor of the rectification switch is very small, its conduction voltage may be lower than the offset voltage of the comparator. This can affect the accuracy of the zero-crossing detection, and may degrade the performance of the synchronous rectification circuit.

In a synchronous rectification circuit that may be part of a switching voltage regulator, a rectification switch can be coupled to an inductor. In order to eliminate an output filter current, and to reduce electromagnetic and switching losses, as well as to prevent a current from flowing back, the synchronous rectification circuit can be controlled to operate under an inductor current DCM. The rectification switch can be turned off when an inductor current is zero, to improve performance of the synchronous rectification circuit. Also, a synchronous rectification circuit can be configured as part of any suitable converter topology (e.g., boost, buck, boost-buck, etc.). The boost circuit structure can also be referred to as a step-up rectification circuit, the buck circuit structure can also be referred to as a step-down rectification circuit, and the boost-buck circuit structure can also be referred to as a step-up and step-down rectification circuit. For example, a rectification switch in a synchronous rectification circuit can be a metal oxide semiconductor field-effect transistor (MOSFET).

Figure 1:
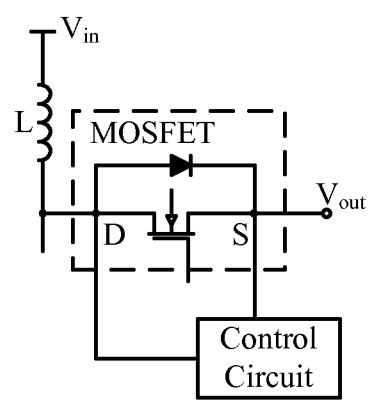
FIG. 1 is a schematic block diagram of a portion of a switching voltage regulator.

Referring now to FIG. 1, shown is a schematic block diagram of a portion of a switching voltage regulator. In this example, rectification switch "MOSFET" has a body diode. When synchronous rectification switch MOSFET is off, if a current flowing through inductor L in the synchronous rectification circuit is not yet reduced to zero, the inductor current can flow through the body diode. Thus, the body diode may conduct, and in this case a voltage drop between drain D and source S of rectification switch MOSFET is a conduction voltage of the body diode. However, if the inductor current is reversed when the rectification switch is off, a drain-source voltage of rectification switch MOSFET can be zero.

As compared to a Schottky type of diode, a rectification switch MOSFET may have a worse reverse recovery performance with a lower reverse recovery speed, and a larger reverse recovery charge. This can result in increased switching losses, reduced system efficiency, and higher ringing, which can also affect safe operation of rectification switch MOSFET. Therefore, rectification switch MOSFET should be turned off, that is the body diode should be off when the inductor current is zero. In practical applications, a conduction voltage of the body diode is about 0.6V (e.g., silicon transistor) or 0.3V (e.g., germanium transistor). When rectification switch MOSFET is off, if the inductor current flowing through rectification switch MOSFET is not yet reduced to zero, drain-source voltage $V_{DS}$ of rectification switch MOSFET can equal conduction voltage of the body diode.

In particular embodiments, an appropriate voltage can be selected as a reference voltage. This reference voltage may be compared against a drain-source voltage of the rectification switch when the rectification switch is off. Adjustments can be made such that the rectification switch is subsequently turned off when the drain-source voltage is less than the reference voltage, in order to turn the rectification switch off when the inductor current is zero.

In one embodiment, a synchronous rectification control method can include: (i) setting or updating a count value when a rectification switch is turned on; (ii) generating an off enable signal after a delay time corresponding to the count value has elapsed; (iii) turning off the rectification switch based on the off enable signal, and comparing a drain-source voltage of the rectification switch against a reference voltage; and (iv) generating a comparison signal for updating the count value based on the drain-source voltage and the reference voltage.

Figure 2:
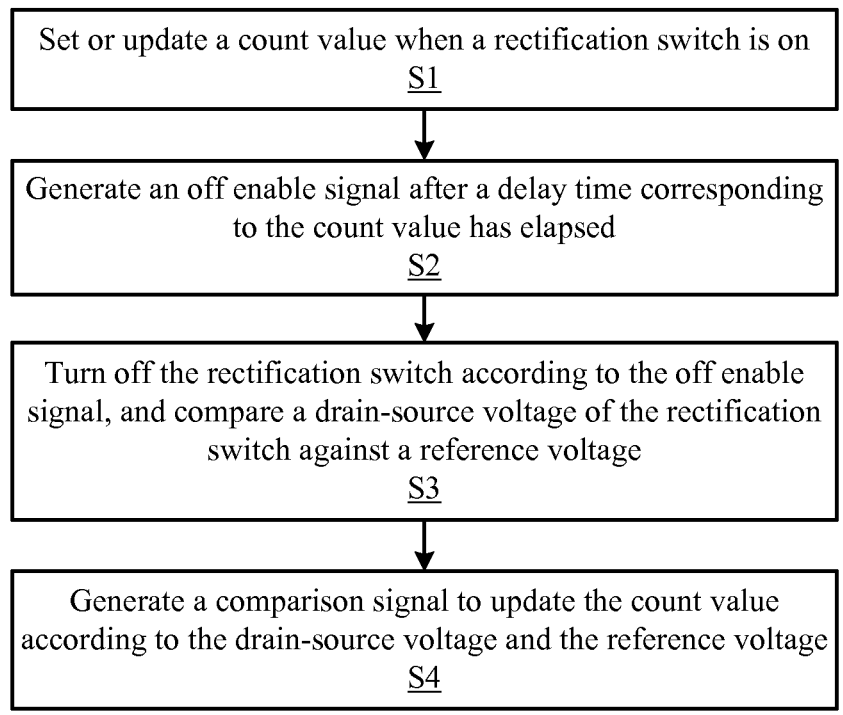
FIG. 2 a flow diagram of an example synchronous rectification control method, in accordance with embodiments of the present invention.

Referring now to FIG. 2, shown a flow diagram of an example synchronous rectification control method, in accordance with embodiments of the present invention. At S1, a count value can be set or updated when a rectification switch (e.g., a MOSFET transistor) is on. For example, the count value may have a mapping relationship with a delay time that lasts from a turning on time to a turning off time of the rectification switch. At S2, an off enable signal can be generated after the delay time corresponding to the count value has elapsed.

At S3, the rectification switch can be turned off according to the off enable signal, and drain-source voltage $V_{DS}$ of the rectification switch can be compared against reference voltage $V_{ref}$. At S4, a comparison signal can be generated for updating the count value according to drain-source voltage $V_{DS}$ and reference voltage $V_{ref}$. For example, when drain-source voltage $V_{DS}$ is greater than reference voltage $V_{ref}$, the count value can be increased (e.g., incremented by 1), and when drain-source voltage $V_{DS}$ is less than reference voltage $V_{ref}$, the count value can be decreased (e.g., decremented by 1).

For example, the reference voltage can be less than the conduction voltage of the body diode in the rectification switch. The body diode of rectification switch MOSFET for a silicon transistor with, e.g., a 0.6V conduction voltage, can result in the reference voltage being set to less than about 0.6V. In practical applications, an operational amplifier can be used to compare the drain-source voltage and the reference voltage. However, because input offset voltage $V_{os}$ can exist in a non-ideal operational amplifier, reference voltage $V_{ref}$ can be set to be greater than offset voltage $V_{os}$ to avoid input offset voltage effects on synchronous rectification control. In this example, the reference voltage can be set or otherwise predetermined in a range of from about 0.2V to about 0.5V. In this way, the rectification switch can be turned off when the body diode is off (e.g., the inductor current is zero) despite influence of the offset voltage.

Also at S1, the count value can be set to a predetermined value when the rectification switch is turned on for the first time. The count value (e.g., a positive integer) can be updated according to a comparison signal when the rectification switch is turned on again. In this example, when the rectification switch is turned on again in a next execution cycle, the count value can be automatically updated according to a comparison result of drain-source voltage $V_{DS}$ and reference voltage $V_{ref}$ from when the rectification switch was turned off. In this way, an appropriate count value can be determined based on how long it takes to turn off the rectification switch after it has been turned on.

When the rectification switch is turned on, the count value can be set, and the rectification switch can be turned off after the delay time corresponding to the count value has elapsed. When the rectification switches turned off, drain-source voltage $V_{DS}$ can be compared against reference voltage $V_{ref}$ (e.g., from about 0.2V to about 0.5V) when the rectification switch is off. When drain-source voltage $V_{DS}$ is greater than reference voltage $V_{ref}$, representing a voltage drop on the body diode of the rectification switch, and thus that the inductor current is not yet reduced to zero, it may be too early to turn off the rectification switch. Thus, the present count value can be incremented or otherwise increased to extend the delay time from turning on to turning off of the rectification switch in a switching cycle. When drain-source voltage $V_{DS}$ is less than reference voltage $V_{ref}$, indicating that the body diode of the rectification switch is off, and that the inductor current is zero or reversed when the rectification switch is turned off, it may be too late to turn off the rectification switch. Thus, the present count value can be decremented or otherwise decreased to shorten the delay time from turning on to turning off the rectification switch in a switching cycle.

In this fashion, the delay time lasting from a turn on time to a turn off time of the rectification switch can be regulated or adjusted by updating the count value, such that the rectification switch is turned off when the inductor current is zero. By updating the count value to adjust the delay time according to a comparison result of the drain-source voltage and the reference voltage, the rectification switch can be turned off when the inductor current is reduced to zero. This can effectively reduce switching losses, as well as improve inductor current detection accuracy and overall system performance. The comparison signal for updating the count value can be generated according to a comparison of drain-source voltage $V_{DS}$ and reference voltage $V_{ref}$. When the rectification switch is turned off, the drain-source voltage of the rectification switch can be sampled and compared against the reference voltage. For example, when the drain-source voltage is greater than the reference voltage, a first comparison signal can be activated, and when the drain-source voltage is less than the reference voltage, a second comparison signal can be activated.

For example, if the present count value is N, where N>0, if the first comparison signal is activated, the present count value can be incremented to be N+1, in order to extend the delay time. However, if the second comparison signal is activated, the present count value can be decremented to be N−1, in order to shorten the delay time. In adjusting a delay time, a count value of "1" can indicate a single time unit, and the delay time can be adjusted or regulated by changing the count value.

In this example, when drain-source voltage $V_{DS}$ is greater than reference voltage $V_{ref}$, the first comparison signal is generated to increase the count value by step of unit time; when drain-source voltage $V_{DS}$ is less than reference voltage $V_{ref}$, the second comparison signal is generated to decrease the count value by step of unit time, so as to regulate the delay time lasting from turning on moment to turning off moment of the rectification switch. Also, there may be an initial predetermined count value for the first time that the rectification switch is turned on. The delay time can then be regulated by changing a present count value such that the rectification switch is turned off when the inductor current is zero through repeated adjustment. Further, the accuracy of this regulation can be improved by reducing the unit of delay time that corresponds to a count value adjustment.

In one embodiment, a synchronous rectification control circuit can include: (i) a counting circuit configured to set or update a count value when a rectification switch is turned on; (ii) a delay circuit configured to receive the count value, and to generate an off enable signal after a delay time corresponding to the count value has elapsed; (iii) a main control circuit configured to receive the off enable signal, and to turn off the rectification switch according to the off enable signal; and (iv) a comparison circuit configured to compare a drain-source voltage of the rectification switch against a reference voltage after the rectification switch is turned off, and to provide a comparison signal to the counting circuit to update the count value.

Figure 3:
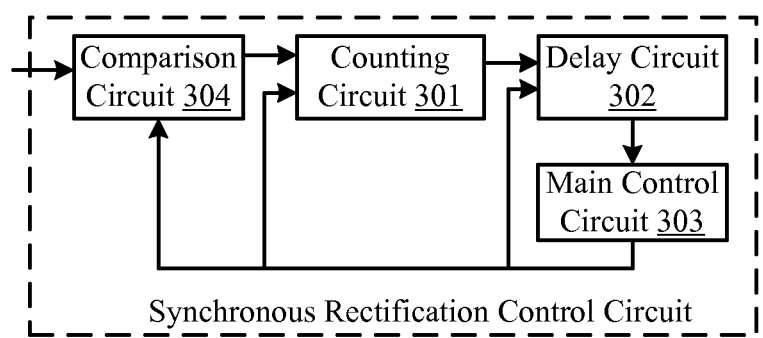
FIG. 3 is a block diagram of an example synchronous rectification control circuit, in accordance with embodiments of the present invention.

Referring now to FIG. 3, shown is a block diagram of an example synchronous rectification control circuit, in accordance with embodiments of the present invention. This particular example rectification circuit can be a boost type of converter topology; however, any suitable topology (e.g., buck, buck-boost, etc.) can be employed in particular embodiments. Here, a synchronous rectification control circuit can include counting circuit 301 configured for setting or updating a count value when rectification switch MOSFET is on. Also, delay circuit 302 can be coupled to counting circuit 301, and may receive the count value, and generate an off enable signal after a delay time corresponding to the count value has elapsed. The synchronous rectification control circuit can also include main control circuit 303 coupled to delay circuit 302, which may control turn off of rectification switch MOSFET according to the off enable signal.

Comparison circuit 304 can connect to main control circuit 303 and rectification switch MOSFET, and may be used to compare drain-source voltage $V_{DS}$ of rectification switch MOSFET against reference voltage $V_{ref}$ after rectification switch MOSFET is turned off by main control circuit 303. For example, reference voltage $V_{ref}$ can be in a range of from about 0.2V to about 0.5V. Comparison circuit 304 can also generate a comparison signal for updating the count value in counting circuit 301 according to the drain-source voltage and the reference voltage comparison. When synchronous rectification switch MOSFET is off, if a current flowing through inductor L in the synchronous rectification circuit is not yet reduced to zero, the inductor current can flow through a conducting body diode. In such a case, the voltage drop between drain D and source S of rectification switch MOSFET is the conduction voltage of the body diode. However, if the inductor current is reversed when the rectification switch is off, the drain-source voltage of rectification switch MOSFET can be zero.

By turning off rectification switch MOSFET when the inductor current is zero, switching losses can be reduced, and overall system efficiency can be improved. When rectification switch MOSFET is turned off, an initial count value in counting circuit 301 can be predetermined as any suitable non-negative value. The count value can then be updated to obtain a new count value after receiving the comparison signal output from comparison circuit 304 in a next execution cycle. The delay time represented by the count value can be regulated by repeatedly updating the present count value. Delay circuit 302 can provide the off enable signal to main control circuit 303 after the delay time corresponding to the count value has elapsed. Also, main control circuit 303 can turn off rectification switch MOSFET according to the off enable signal, and comparison circuit 304 can compare drain-source voltage $V_{DS}$ against reference voltage $V_{ref}$ to update the count value according to the comparison result. In this way, rectification switch MOSFET can be turned off at a zero current point of the inductor.

In this particular example, reference voltage $V_{ref}$ can be set to be less than the conduction voltage of the body diode in the rectification switch. For a silicon transistor, the conduction voltage can be about 0.6V, so reference voltage $V_{ref}$ can be less than about 0.6V. Also, an operational amplifier can be used to compare drain-source voltage $V_{DS}$ and reference voltage $V_{ref}$, and an input offset voltage $V_{os}$ can exist in a non-ideal operational amplifier. Thus, reference voltage $V_{ref}$ can be set to be less than the conduction voltage of the body diode, and greater than offset voltage $V_{os}$ to avoid effects on the synchronous rectification control circuit due to offset voltage $V_{os}$. For example, the reference voltage can be in a range of from about 0.2V to about 0.5V.

The count value can be continuously updated by periodically controlling rectification switch MOSFET (e.g., turning on/off rectification switch MOSFET for several times), in order to turn off the rectification switch when the inductor current is reduced to zero. Also, main control circuit 303 can generate an off control signal to turn off rectification switch MOSFET. In one example implementation, a high level signal can be configured as activation of the off enable signal, and main control circuit 303 can generate an off control signal in response to activation of the off enable signal, in order to turn off rectification switch MOSFET (e.g., by discharging a gate voltage thereof).

The count value can be set/updated by counting circuit 301 when rectification switch MOSFET is turned on. The off enable signal can be generated after the delay time has elapsed via delay circuit 302. Main control circuit 303 can generate an off control signal to turn off rectification switch MOSFET. Thus, by comparing the drain-source voltage of rectification switch MOSFET against the reference voltage via comparison circuit 304, and providing the comparison result to counting circuit 301 to update the comparison result, the present count value can be updated to regulate the delay time from a turn on time to a turn off time of rectification switch MOSFET. In this fashion, the rectification switch can be turned off when the inductor current is reduced to zero.

Referring now to FIG. 4, shown is a schematic block diagram of an example synchronous rectification control circuit, in accordance with embodiments of the present invention. In this example, the synchronous rectification control circuit can include counting circuit 301, delay circuit 302, main control circuit 303, and comparison circuit 304. For example, comparison circuit 304 can include reference voltage source U and comparator Q. Also, reference voltage source U1 can be used to generate reference voltage $V_{ref}$.

Comparator Q1 can include input terminals coupled to source S of rectification switch MOSFET via reference voltage source U1, and to drain D of rectification switch MOSFET in order to sample the drain-source voltage of rectification switch MOSFET. Comparator Q1 can sample drain-source voltage $V_{DS}$ of rectification switch MOSFET when rectification switch MOSFET is turned off, and may compare drain-source voltage $V_{DS}$ against reference voltage $V_{ref}$. For example, when drain-source voltage $V_{DS}$ is greater than reference voltage $V_{ref}$, a first comparison signal or a high level signal can be generated, and when drain-source voltage $V_{DS}$ is less than reference voltage $V_{ref}$, a second comparison signal or a low level signal can be generated.

For example, the positive input terminal "+" of comparator Q1 can connect to an output terminal of reference voltage source U1, and the negative input terminal "−" of comparator Q1 can connect to the drain D of rectification switch MOSFET in order to sample the drain-source voltage $V_{DS}$ of rectification switch MOSFET. In one particular example, a low level signal output from comparator Q1 (e.g., an operational amplifier) can be detected as activation of a "first" comparison signal or state, and a high level signal output from comparator Q1 can be detected as activation of a "second" comparison signal or state. Comparison circuit 304 can also include latch SR1 for latching a state (e.g., high or low) of the comparison signal output from comparator Q1.

Latch SR1 (e.g., an SR latch) can include set input terminal S, reset input terminal R, and output terminal Q. Set input terminal S can connect to an output terminal of comparator Q1, reset input terminal R can connect to an output terminal of main control circuit 303, and output terminal Q can connect to an input terminal U/D of counting circuit 301. Latch SR1 can latch the comparison signal state, and then provide to delay circuit 302. Latch SR1 or RS flip-flop can include two NAND-gates in a cross coupled configuration. Counter T1 in counter circuit 301 can include data input terminal U/D, clock terminal CLK, and data output terminals $Y_1$ to $Y_N$. Data input terminal U/D can connect to an output terminal of comparison circuit 304, e.g., output terminal Q of latch SR1. Also, clock terminal CLK can connect to an output terminal of main control circuit 303, and data output terminals $Y_1$~$Y_N$ can connect to an input terminal of delay circuit 302.

Counter T1 can set or update the count value when the rectification switch is turned on. As discussed above, the count value can be set to a predetermined value when the rectification switch is turned on for the first time. Also, the present count value can be updated according to the comparison signal when rectification switch MOSFET is turned on again. For example, counter T1 can be an up-down counter. The up-down counter can update the present count value as N+1 to extend the delay time when the comparison signal is active (e.g., high), and may update the present count value as N−1 to shorten the delay time when the comparison signal is inactive (e.g., low). For example, N can be the present count value, and N is an integer greater than 0.

For example, the up-down counter can receive latch data of latch SR1 when the rectification switch is turned on. The data input terminal of the up-down counter can connect to output terminal Q of latch SR1, and the clock input terminal of the up-down counter can connect to an output terminal of main control circuit 303, so as to be controlled by main control circuit 303. In one example, delay circuit 302 can include digital-analog converter (DAC) DAC1 that receives the count value output from counter T1. DAC1 can generate a converting voltage corresponding to the count value. Also, a charging circuit in delay circuit 302 can receive the converting voltage, and may generate a charging voltage by using the converting voltage as a reference voltage. In this example, when the charging voltage equals a level of the converting voltage, an off enable signal can be activated for turning off the rectification switch For example, the charging circuit can include source I1, comparator Q2, capacitor C1, and field-effect transistor D1. Current source I1 can connect to capacitor C1 to charge capacitor C1 to generate the charging voltage. Comparator Q2 can connect to DAC1, current source I1 and capacitor C1, and may compare the charging voltage against the converting voltage to generate the off enable signal. The source of transistor D1 can connect to an output terminal of comparator Q2, the drain can connect to an output terminal of current source I1 and the gate can be grounded. In this example, the count value can be converted to a corresponding voltage signal, where a different count value reflects a different converting voltage. The converting voltage can be used as a reference voltage to generate the charging voltage secondly, and when the charging voltage equals the converting voltage, a delay time corresponding to the count value has elapsed.

DAC1 can be used to convert the count value to a corresponding converting voltage. Capacitor C1 can be charged via current source I1 comparator Q2 can compare the converting voltage against the charging voltage. For example, when DAC1 maps the count value with the corresponding voltage, the charging efficiency or required charging time for capacitor C1 can also be considered. In one case, the time for charging capacitor C1 to the converting voltage equals to the delay time corresponding to the count value.

In particular embodiments, comparator Q2 can connect to DAC1, current source I1 and capacitor C1 in different configurations. In one configuration, one terminal of capacitor C1 can be grounded, and the other terminal can connect to the positive input terminal of comparator Q2 and the output terminal of current source I1 Also, the negative input terminal of comparator Q2 can connect to the output terminal of digital-analog converter DAC1. In another configuration, one terminal of capacitor C1 is grounded, and the other terminal can connect to the negative input terminal of comparator Q2 and the output terminal of current source I1 Also, the positive input terminal of comparator Q2 can connect to the output terminal of digital-analog converter DAC1.

Main control circuit 303 can include latch SR2 for generating the off control signal. When capacitor C1 is coupled to the negative input terminal of comparator Q2 and the output terminal of digital-analog converter DAC1 is coupled to the positive input terminal of comparator Q2, the output terminal of comparator Q2 can connect to the reset input terminal of second latch SR2, in order to transfer the off enable signal to latch SR2 for generating the off signal. When capacitor C1 is coupled to the positive input terminal of comparator Q2 and the output terminal of digital-analog converter DAC1 is coupled to the negative input terminal of comparator Q2, main control circuit 304 also includes inverter Inv1.

The output terminal of comparator Q2 can connect to the reset input terminal of latch SR2 via inverter Inv1, to transfer the inverted off enable signal to latch SR2 (e.g., an RS flip-flop) for generating the off signal. In this example, latch SR2 can receive an external control signal at the set input terminal, in order to control the level of the output of latch SR2 according to the particular circuit operation state. When output terminal OUT of digital-analog converter DAC1 is coupled to the negative input terminal of comparator Q2, and the positive input terminal of comparator Q2 is coupled to current source I1, the off enable signal from comparator Q2 can be active high level. However, because the off enable signal output from comparator Q2 is provided to reset input terminal R of latch SR2, inverter Inv1 is employed to invert the off enable signal in advance.

Up-down counter T1 in counting circuit 301 can provide the preset count value to DAC1 when rectification switch MOSFET is turned on for the first time, and may update the count value according to the output of latch SR1 when rectification switch is turned on again. The updated count value can be provided to DAC1 for conversion of the count value to a corresponding converting voltage. Comparator Q2 can compare the converting voltage against the charging voltage of capacitor C1. When the charging voltage of capacitor C1 equals the converting voltage, the delay time corresponding to the count value has elapsed, and the off enable signal can be activated to latch SR2. Latch SR2 can then activate the off control signal to turn off rectification switch MOSFET. Also, comparator Q1 can compare drain-source voltage $V_{DS}$ against reference voltage $V_{ref}$ when rectification switch MOSFET is turned off, and may generate a comparison result signal (e.g., high or low comparison signal state) for updating the count value. The comparison signal can be provided to up-down counter T1 for updating the count value when rectification switch MOSFET is turned on again.

Thus in particular embodiments, by periodic execution, the rectification switch can be turned off when the inductor current is reduced to zero, in order to precisely achieve zero current shutdown. The synchronous rectification control circuit of certain embodiments can turn off the rectification switch after a precise delay time, and may compare the drain-source voltage of the rectification switch against a reference voltage. It can be determined if the rectification switch is turned off when the inductor current is zero in the former switching cycle according to a comparison result, and the delay time from turn on time to turn off time in the next switching cycle can be regulated according to the determination. In this way, the rectification switch can be controlled to be turned off when the inductor current is reduced to zero. Also, because the reference voltage is greater than the offset voltage of the comparator, but less than the conduction voltage of the diode, zero current detection may not be affected by the offset voltage of the comparator, thus improving circuit control precision.

Referring now to FIG. 5, shown is a schematic block diagram of an example switching voltage regulator, in accordance with embodiments of the present invention. The switching voltage regulator can include example switch circuit with power switch (e.g., power transistor) SW, inductor L, and rectification switch MOSFET. Here, a boost switch circuit is shown; however, any suitable converter topology (e.g., buck, buck-boost, etc.) can be utilized in particular embodiments. In this example arrangement, when power switch SW is turned off, rectification switch MOSFET can be turned on. The synchronous rectification control circuit can include counting circuit 301, delay circuit 302, main control circuit 303, and comparison circuit 304, for controlling rectification switch MOSFET, such as to turn off rectification switch MOSFET when inductor current is reduced to zero.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A synchronous rectification control method, comprising:
   a) setting or updating a count value in a counting circuit when a rectification switch is turned on, wherein said count value is updated by incrementing or decrementing said count value;
   b) setting a delay time based on said count value in order to determine a turning off time of said rectification switch;
   c) activating an off enable signal after said delay time has elapsed, wherein said delay time lasts from a turning on time to said turning off time of said rectification switch;
   d) turning off said rectification switch in response to said off enable signal being activated;
   e) comparing a drain-source voltage of said rectification switch against a reference voltage; and
   f) generating a comparison signal for updating said count value based on said comparison of said drain-source voltage against said reference voltage.

2. The method of claim 1, wherein said setting or updating said count value further comprises:
   a) setting said count value to a predetermined value when said rectification switch is initially turned on; and
   b) updating said count value according to said comparison signal when said rectification switch is turned on again.

3. The method of claim 2, wherein said generating said comparison signal comprises:
   a) generating a first comparison signal state when said drain-source voltage is greater than said reference voltage; and
   b) generating a second comparison signal state when said drain-source voltage is less than said reference voltage.

4. The method of claim 3, wherein said updating said count value comprises:
   a) incrementing a present count value to extend said delay time in response to said first comparison signal state; and
   b) decrementing said present count value to shorten said delay time in response to said second comparison signal state.

5. The method of claim 1, wherein said reference voltage is less than a conduction voltage of a body diode of said rectification switch.

6. A synchronous rectification control circuit, comprising:
   a) a counting circuit configured to set or update a count value when a rectification switch is turned on, wherein said count value is updated by incrementing or decrementing said count value;

b) a delay circuit configured to set a delay time based on said count value in order to determine a turning off time of said rectification switch, and to activate an off enable signal after said delay time has elapsed, wherein said delay time lasts from a turning on time to said turning off time of said rectification switch;

c) a main control circuit configured to receive said off enable signal, and to turn off said rectification switch in response to said off enable signal being activated; and d) a comparison circuit configured to compare a drain-source voltage of said rectification switch against a reference voltage after said rectification switch is turned off, and to provide a comparison signal to said counting circuit to update said count value based on said comparison signal.

7. The synchronous rectification control circuit of claim 6, wherein said comparison circuit comprises a first comparator configured to activate a first comparison signal state when said drain-source voltage is greater than said reference voltage, and to activate a second comparison signal state when said drain-source voltage is less than said reference voltage.

8. The synchronous rectification control circuit of claim 7, wherein said comparison circuit comprises a first latch having a set terminal coupled to an output terminal of said first comparator, a reset terminal coupled to an output terminal of said main control circuit, and an output terminal coupled to an input terminal of said counting circuit.

9. The synchronous rectification control circuit of claim 8, wherein said counting circuit comprises:
a) a counter having a data input terminal coupled to said output terminal of said comparison circuit, a clock terminal coupled to said output terminal of said main control circuit, data output terminals coupled to said input terminal of said delay circuit; and
b) said counter being configured to set said count value when said rectification switch is initially turned on, and to update a present count value according to said comparison signal when said rectification switch is turned on again.

10. The synchronous rectification control circuit of claim 9, wherein said counting circuit comprises an up-down counter configured to increment said present count value to extend said delay time in response to said first comparison signal state, and to decrement said present count value to shorten said delay time in response to said second comparison signal state.

11. The synchronous rectification control circuit of claim 10, wherein said delay circuit comprises:
a) a digital-to-analog converter (DAC) configured to receive said count value, and to generate a converting voltage corresponding to said count value; and
b) a charging circuit configured to generate a charging voltage by using said converting voltage as a reference voltage, wherein said off enable signal is activated when said charging voltage equals said converting voltage.

12. The synchronous rectification control circuit of claim 11, wherein said charging circuit comprises:
a) a current source configured to charge a capacitor to generate said charging voltage;
b) a second comparator coupled to said DAC, said current source, and said capacitor, and being configured to compare said charging voltage against said converting voltage, and to activate said off enable signal when said charging voltage reaches a level of said converting voltage; and
c) a field-effect transistor having a source coupled to an output terminal of said second comparator, a drain coupled to said current source, and a gate that is grounded.

13. The synchronous rectification control circuit of claim 12, wherein:
a) said capacitor is coupled to ground and a first input terminal of said second comparator; and
b) a second input terminal of said second comparator is coupled to an output terminal of said DAC.

14. The synchronous rectification control circuit of claim 13, wherein said main control circuit comprises an inverter and a second latch for generating an off control signal from said off enable signal.

15. A switching voltage regulator, comprising the synchronous rectification control circuit of claim 6, and further comprising:
a) a power switch coupled to an inductor; and
b) said synchronous rectification control circuit being configured to turn off said rectification switch when a current through said inductor current is zero.

16. The method of claim 5, wherein:
a) said comparing said drain-source voltage of said rectification switch against said reference voltage comprises using an operational amplifier; and
b) said reference voltage is greater than an input offset voltage of said operational amplifier.

17. The method of claim 1, wherein said said rectification switch is turned off when a body diode of said rectification switch is off.

18. The synchronous rectification control circuit of claim 6, wherein:
a) said comparison circuit comprises an operational amplifier; and
b) said reference voltage is greater than an input offset voltage of said operational amplifier.

19. The synchronous rectification control circuit of claim 6, wherein said said rectification switch is turned off when a body diode of said rectification switch is off.

20. The synchronous rectification control circuit of claim 6, wherein said reference voltage is less than a conduction voltage of a body diode of said rectification switch.

* * * * *